(12) United States Patent
Arjun et al.

(10) Patent No.: US 10,795,745 B2
(45) Date of Patent: *Oct. 6, 2020

(54) DYNAMIC AND ADAPTIVE APPROACH FOR FAILURE DETECTION OF NODE IN A CLUSTER

(71) Applicant: Hewlett Packard Enterprise Development LP, Houston, TX (US)

(72) Inventors: Vinod Arjun, Karnataka (IN); Sheausong Yang, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 9 days.

This patent is subject to a terminal disclaimer.

(21) Appl. No.: 15/833,414

(22) Filed: Dec. 6, 2017

(65) Prior Publication Data

US 2018/0095818 A1    Apr. 5, 2018

Related U.S. Application Data

(63) Continuation of application No. 14/524,698, filed on Oct. 27, 2014, now Pat. No. 9,842,013.

(51) Int. Cl.
*G06F 11/00* (2006.01)
*G06F 11/07* (2006.01)
*H04L 12/26* (2006.01)

(52) U.S. Cl.
CPC ...... *G06F 11/0757* (2013.01); *G06F 11/0709* (2013.01); *H04L 43/0864* (2013.01)

(58) Field of Classification Search
CPC ............................ G06F 11/0757; G06F 11/0709
See application file for complete search history.

(56) References Cited

U.S. PATENT DOCUMENTS

| 7,254,159 | B1* | 8/2007 | Lavelle | H04B 1/7156 370/342 |
| 7,561,527 | B1* | 7/2009 | Katz | H04L 43/50 370/241 |
| 2008/0066073 | A1* | 3/2008 | Sen | G06F 9/505 718/105 |
| 2008/0082142 | A1 | 4/2008 | Clark et al. | |
| 2012/0327789 | A1 | 12/2012 | Grenier et al. | |
| 2013/0124752 | A1* | 5/2013 | Griffith | G06F 11/3006 709/235 |
| 2013/0322286 | A1* | 12/2013 | Van Doorselaer | H04L 43/0864 370/252 |
| 2014/0066063 | A1 | 3/2014 | Park | |
| 2015/0282177 | A1* | 10/2015 | Dong | H04L 43/0811 370/329 |

* cited by examiner

*Primary Examiner* — Katherine Lin
(74) *Attorney, Agent, or Firm* — Hewlett Packard Enterprise Patent Department

(57) ABSTRACT

The present disclosure discloses a method and a network device for failure detection of nodes in a cluster. Specifically, a network device transmits data to another device at a first time. The network device then receives an acknowledgment of the data from the second device at a second time. Next, the network device determines a Round Trip Time (RTT) for the first device and the second device based on the first time and the second time. Based on the RTT, the network device determines a first frequency for transmitting a heartbeat protocol message between the first device and the second device, and transmits a heartbeat protocol message between the first device and the second device at the first frequency.

14 Claims, 7 Drawing Sheets

DYNAMIC AND ADAPTIVE APPROACH FOR FAILURE DETECTION OF NODE IN A CLUSTER

FIELD

Embodiments of the present disclosure relate to network controller cluster management by network devices. In particular, embodiments of the present disclosure describe a dynamic and adaptive approach for detecting a failure of a peer node in a cluster of network devices.

BACKGROUND

Conventionally, a heartbeat mechanism typically is utilized by nodes in a cluster to detect any failure in a peer node. Particularly, nodes in a cluster exchange heartbeat messages with a pre-configured retry count and at a pre-configured retry intervals. Therefore, the customer bears the burden to configure the appropriate values for the retry count and intervals for heartbeat messages.

Moreover, configuring the retry count and retry intervals for heartbeat messages between any two nodes can be difficult. If a node is pre-configured with a high retry count and/or low retry intervals, the node will be able to detect a peer node's failure fast. However, exchanging heartbeat messages too frequently with the high retry count and low retry intervals will cause the node to transmit too many messages, and may also lead to false positive results. A false positive result occurs when a peer node is experiencing a delay due to temporary network congestion but is deemed as a failed node, because the node is not able to receive a reply heartbeat message from the peer node within the low pre-configured interval time period.

Also, the number of configuration parameters increase linearly with the addition of every node in the cluster. Thus, the customers either opt to configure the retry count and intervals for every pair of nodes in a cluster independently, which can become quite tedious, or to configure a global retry count and interval, which is sub-optimal because nodes in a cluster carry different load and delay characteristics.

DETAILED DESCRIPTION

In the following description, several specific details are presented to provide a thorough understanding. While the context of the disclosure is directed to management of network controller clusters, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications. equivalents, and alternatives falling within the spirit and scope of the present disclosure.

BRIEF DESCRIPTION OF THE DRAWINGS

The present disclosure may be best understood by referring to the following description and accompanying drawings that are used to illustrate embodiments of the present disclosure.

OVERVIEW

Figure 1:
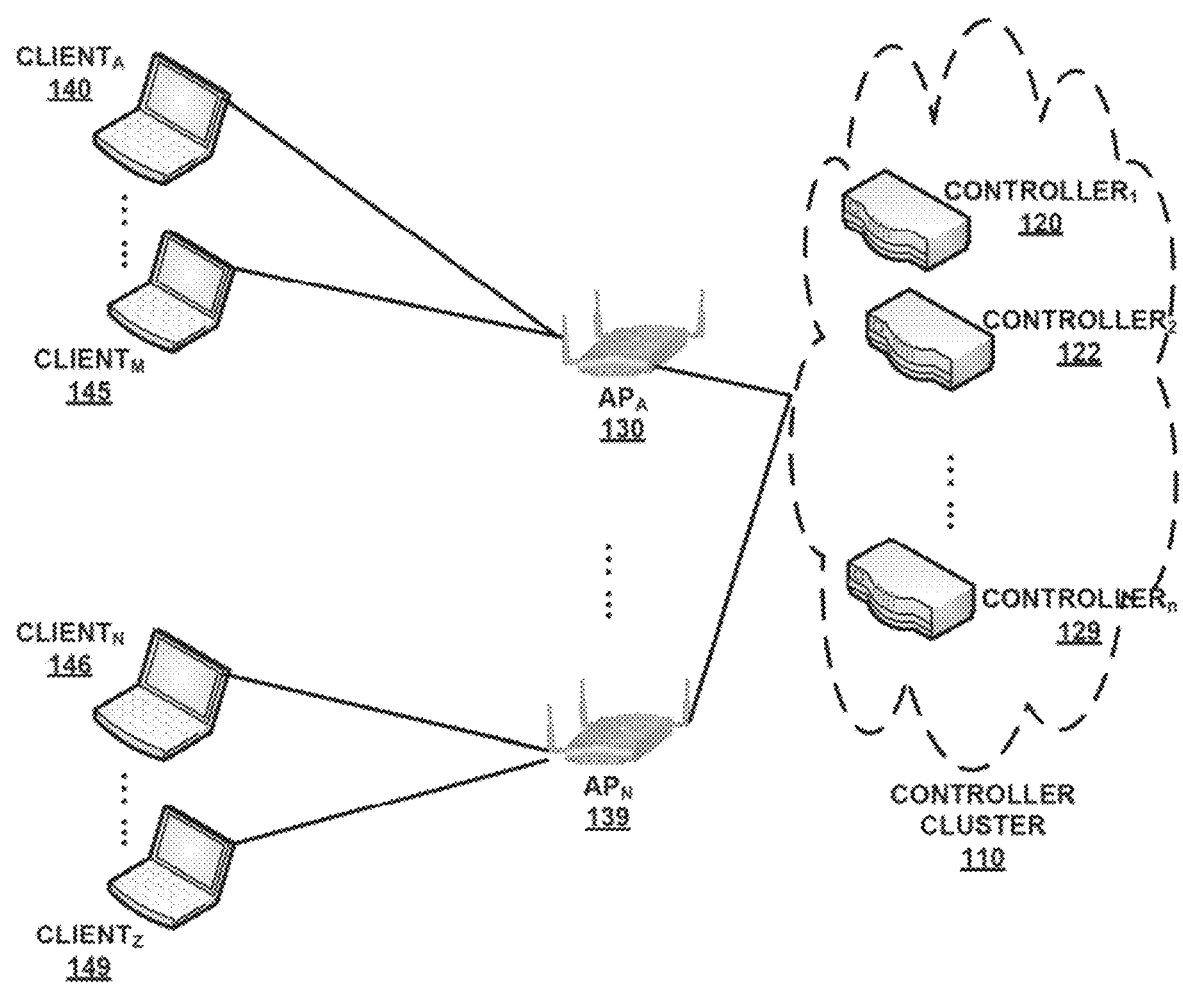
FIG. 1 shows an exemplary network environment according to embodiments of the present disclosure.

Embodiments of the present disclosure relate to management of network controller clusters. In particular, embodiments of the present disclosure describe a dynamic and adaptive approach for failure detection of nodes in a cluster.

In generally, embodiments of present disclosure adopt a dynamic and adaptive approach for detecting peer node failure to avoid burdening the customers with the need to determine heartbeat configuration parameters for nodes in a cluster. Meanwhile, embodiments of the present disclosure provide the capability to detect failure in a node at the earliest possible time by using a Round Trip Delay (RTD, also referred to as Round Trip Time, RTT, interchangeably) between any two nodes in the cluster in the detection of cluster node failure.

Specifically, when the nodes form a cluster, each node sends a first heartbeat message and measures an initial RTD for every other node in the cluster. The nodes are capable of dynamically adjusting the heartbeat message transmission interval to a different value, e.g., as a multiple of RTD, such as 2 * RTD. In some embodiments, the heartbeat message transmission interval can be constrained by a predefined minimum threshold value (e.g., 100 milliseconds). The predefined minimum threshold value can be used to ensure that the heartbeat messages are not being transmitted overly frequently, and thus consuming too much network bandwidth.

A history of RTD data, per cluster node, is maintained in a sliding window, which can be implemented as a circular buffer, with the newest data replacing the oldest data. This history of RTD data can be used to tune the heartbeat transmission interval periodically subject to the predefined minimum threshold.

Moreover, techniques described herein can gradually adapt to the load increase of each individual node. Because the sliding window of the RTD history influences the frequency of the heartbeat message transmission, if an increase in the load on a node will gradually slow down the response time of the heartbeat message. This may be due to internal queueing delay of processing heartbeat messages.

In addition, techniques described herein will also reduce the false positive due to individual loading of the node. As soon as a node detects that a peer is not responding to a heartbeat message despite of the tuning of frequency based on RTD history, the dynamically reduces the heartbeat message transmission interval after each heartbeat miss (i.e. failure to receive a response to a previously transmitted heartbeat message) until the heartbeat message transmission interval reduces to the maximum RTD observed in the RTD history. Thereafter, if the node continues to detect heartbeat miss, the peer node is declared as lost. Thus, for each heartbeat miss, transmissions of the heartbeat messages are retried more aggressively and frequently than conventional mechanisms. In other words, a failure of response detected on an infrequent check will lead to subsequent checks with increasing frequency to verify and confirm the failed peer node.

Moreover, embodiments of the present disclosure use the heartbeat messages and RTDs in a symmetrical way, such that the RTD measurements are performed by each node without relying on any clock synchronization between nodes involved in the heartbeat protocol messages. The rate adaptation is also done on each node independent of the other node. As a result, the two heartbeat message directions (e.g., from node A to B to A versus from node B to A to B can run at different frequencies and also can be rate adapted independently.

Embodiments of the present disclosure adapt well to heterogeneously located nodes, for example, when a few nodes in the same location having very low latency, whereas another few nodes in a different location also having very low latency, but the latency between the two locations are relatively large. According to embodiments of the present disclosure, every co-located pair of nodes (i.e., pairs of nodes in the same location) exchange heartbeat messages at a higher frequency, and thus enabling faster peer node failure detection. By contrast, the pairs of nodes in different locations exchange heartbeat messages at a lower frequency, and thus relatively slowing down the failure detection to avoid falsely declaring a node as lost due to temporary network delays.

With the solution provided herein, a network device transmits data to another device at a first time. The network device then receives an acknowledgment of the data from the second device at a second time. Next, the network device determines a Round Trip Time (RTT) for the first device and the second device based on the first time and the second time. Based on the RTT, the network device determines a first frequency for transmitting a heartbeat protocol message between the first device and the second device, and transmits a heartbeat protocol message between the first device and the second device at the first frequency.

Network Computing Environment

FIG. 1 shows an exemplary network environment according to embodiments of the present disclosure. Specifically, FIG. 1 illustrates a network that includes at least a network controller cluster 110, a number of access points (APs) (such as, $AP_A$ 130 to $AP_N$ 139), and a plurality of client devices, such as $Client_A$ 140, ..., $Client_M$ 145, $Client_N$ 146, $Client_Z$ 149, etc.

Access points, e.g., $AP_A$ 130 to $AP_N$ 139, generally refer to a set of wireless network devices that allow wireless client devices to connect to a wired network using IEEE 802.11 or related standards. The APs usually connect to a router via a wired network, but can also be an integral component of the router itself.

Each access point serves one or more client devices. For illustration purposes only, assuming that, in FIG. 1, a first set of client devices, such as $Client_A$ 140, ..., $Client_M$ 145, associate with $AP_A$ 130. Moreover, assuming that a second set of client devices, such as $Client_N$ 146, ..., $Client_Z$ 149, associate with $AP_N$ 139.

Network controller cluster 110 further includes two or more network controllers, such as $Controller_1$ 120, $Controller_2$ 122, ..., $Controller_n$ 129, etc. A cluster is generally defined as a group of entities or nodes. Here, a number of network controllers in network controller cluster 110 work collectively and collaboratively to provide network services to network client devices. Each network controller in network controller cluster 110 provides a set of services to a number of APs. If a particular network controller (e.g., $Controller_1$ 120) in network controller cluster 110 is down, other network controllers (e.g., $Controller_2$ 122, ..., $Controller_n$ 129) in network controller cluster 110 should be able to detect that the particular network controller (e.g., $Controller_1$ 120) went down from the network such that the other network controllers can provide the services to the number of APs that the particular network controller was providing previously. Therefore, it is important that the nodes in a cluster can detect the loss of a peer node quickly and reliably.

Here, a network controller generally refers to a controlling device that manages other network devices such as wireless access points. Network controller 110 may handle automatic adjustments to radio frequency power, wireless channels, wireless authentication, and/or security, and deliver essential mobility services such as AppRF™ technology for OSI Layer 4-7 application control, multicast Domain Name System (DNS) optimization, IP roaming, and Security Assertion Markup Language (SAML) integration based on user roles, devices. applications and location. Furthermore, network controller 110 can be combined to form a wireless mobility group to allow inter-controller roaming. In some embodiments, network controller 110 can centralize IP services and policy control across wired and wireless as well as simplify the integration of network security and third-party enterprise application platforms.

During operations, each network controller (e.g., $Controller_1$ 120) in network controller cluster 110 periodically transmits a heartbeat message to other network controllers (e.g., $Controller_2$ 122, ..., $Controller_n$ 129) in network cluster 110. The heartbeat message indicates to other network controllers that the source network controller is still active on the network. The heartbeat messages are transmitted at a predefined interval. If a particular network controller does not receive any response from another network controller after transmitting a heartbeat message, the particular network controller will retry the transmission of the heartbeat message a few times. Thereafter, if the particular network controller still fails to receive a response from the other network controller, then the particular network controller will regard the other network controller as being lost or inactive from the network. The intervals, at which the heartbeat messages are transmitted, are usually statically configured.

Basic Heartbeat Mechanism

Figure 2:
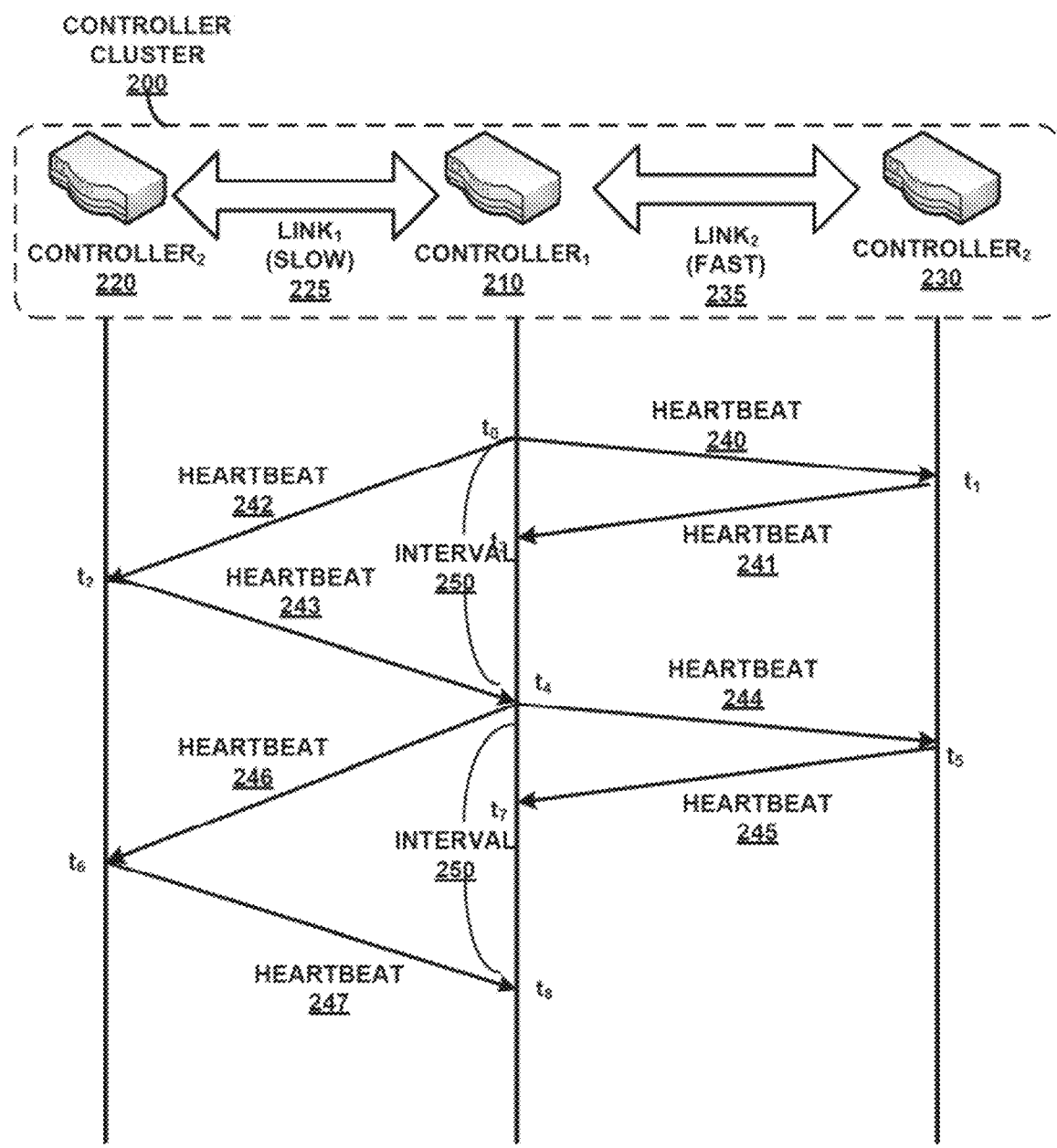
FIG. 2 shows a sequence diagram illustrating exemplary network communication exchanges involved during failure detection of a peer node in a cluster according to embodiments of the present disclosure.

FIG. 2 shows a sequence diagram illustrating exemplary network communication exchanges involved during failure detection of a peer node in a cluster according to embodiments of the present disclosure. FIG. 2 includes at least a $Controller_1$ 210, a $Controller_2$ 220, and a $Controller_3$ 230. $Controller_1$ 210, $Controller_2$ 220, and $Controller_3$ 230 belong to a controller cluster 200. Although only three network controllers are depicted in controller cluster 200, there can be any number of network controller(s) in controller cluster 200.

Moreover, the network controllers in controller cluster 200 are interconnected, e.g., via wired links. Different links between different pairs of network controllers in controller cluster 200 may have different speed. In the example illustrated in FIG. 2, Controller$_1$ 210 and Controller$_2$ 220 are interconnected by Link 225, which is a link with relatively slow transmission rate. By contrast, Controller$_1$ 210 and Controller$_3$ 230 are interconnected by Link$_2$ 235, which is a link with relatively fast transmission rate.

During operations, at time point $t_0$, Controller$_1$ 210 transmits a heartbeat message to each of its peer node, including at least a heartbeat message 240 transmitted to Controller$_3$ 230 via Link$_2$ 235 and a heartbeat message 242 transmitted to Controller$_2$ 220 via Link$_1$ 225. Because Link$_2$ 235 is a relatively fast link, Controller$_3$ 230 receives heartbeat message 240 at time point $t_1$, and immediately responds with a heartbeat message 241 to Controller$_1$ 210. Heartbeat message 241 is subsequently received by Controller$_1$ 210 at time point $t_3$. By contrast, because Link$_1$ 225 is a relatively slow link, Controller$_2$ 220 receives heartbeat message 242 at time point $t_2$, which is later than time point $t_1$. Controller$_2$ 220 then responds with a heartbeat message 243, which is received at time point $t_4$ by Controller$_1$ 210.

In a controller cluster with a large number of nodes, the number of configuration parameters increase significantly in a cluster. Thus, a global heartbeat interval is often configured for all nodes in the cluster. In this example, interval 250 is configured for all heartbeat messages transmitted from Controller$_1$ 210. Accordingly, after interval 250, at time point $t_4$, Controller$_1$ 210 transmits the next heartbeat message to each of its peer node, including at least a heartbeat message 244 transmitted to Controller$_3$ 230 via Link$_2$ 235 and a heartbeat message 246 transmitted to Controller$_2$ 220 via Link$_1$ 225. Similar to the first heartbeat message exchanges, Controller$_3$ 230 receives heartbeat message 244 at time point $t_5$, and immediately responds with a heartbeat message 245 that is received by Controller$_1$ 210 at time point $t_7$. On the other hand, Controller$_2$ 220 receives heartbeat message 246 at time point $t_6$, which is later than time point $t_5$. Controller$_2$ 220 then responds with a heartbeat message 247, which is received at time point $t_8$ by Controller$_1$ 210.

If a node (e.g., Controller$_1$ 210) is pre-configured with a low heartbeat interval, the node will be able to detect a peer node's failure fast. However, exchanging heartbeat messages too frequently may lead to false detection of node failures. Therefore, the basic heartbeat mechanism as illustrated in FIG. 2 typically configures a single heartbeat interval for a node that accommodates the slowest link associated with the node.

Adaptive Heartbeat Protocol

The adaptive heartbeat protocol described in embodiments of the present disclosure allow for asymmetric heartbeat intervals between different pairs of peer nodes, or different heartbeat messages transmitted in different directions between the same pair of peer nodes. Moreover, the adaptive heartbeat protocol can dynamically adjust the interval value, for example, increasing the interval when the peer node responds slowly and decreasing the interval when the peer node responds quickly. In addition, when a packet loss is detected, the adaptive heartbeat protocol will aggressively increase the frequency of transmitting subsequent retry heartbeat messages in order to quickly confirm whether the peer node is lost from the network.

A. Asymmetric Heartbeat Intervals

Figure 3:
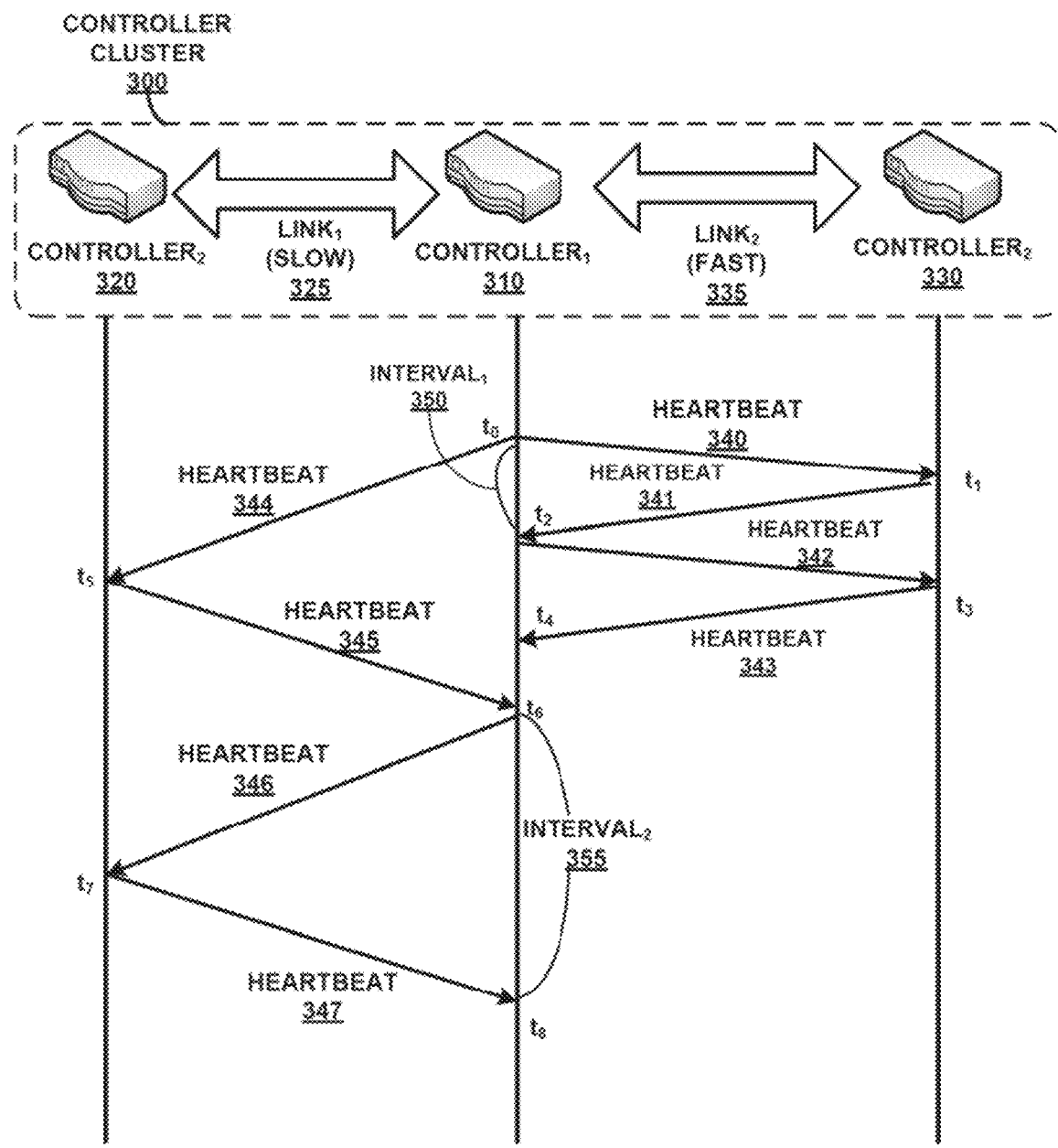
FIG. 3 shows a sequence diagram illustrating exemplary network communication exchanges involved during failure detection of a peer node in a cluster according to embodiments of the present disclosure.

FIG. 3 shows a sequence diagram illustrating exemplary network communication exchanges involved during failure detection of a peer node in a cluster according to embodiments of the present disclosure. FIG. 3 includes at least a Controller$_1$ 310, a Controller$_2$ 320, and a Controller$_3$ 330. Controller$_1$ 310, Controller$_2$ 320, and Controller$_3$ 330 belong to a controller cluster 300. Although only three network controllers are depicted in controller cluster 300, there can be any number of network controller(s) in controller cluster 300.

Moreover, the network controllers in controller cluster 300 are interconnected, e.g., via wired links. Different links between different pairs of network controllers in controller cluster 300 may have different speed. In the example illustrated in FIG. 3, Controller$_1$ 310 and Controller$_2$ 320 are interconnected by Link$_1$ 325, which is a link with relatively slow transmission rate. By contrast, Controller$_1$ 310 and Controller$_3$ 330 are interconnected by Link$_2$ 335, which is a link with relatively fast transmission rate.

According to the adaptive heartbeat protocol, at time point $t_0$, Controller$_1$ 310 transmits a heartbeat message to each of its peer node, including at least a heartbeat message 340 transmitted to Controller$_3$ 330 via Link$_2$ 335 and a heartbeat message 344 transmitted to Controller$_2$ 320 via Link$_1$ 325. Because Link$_2$ 335 is a relatively fast link, Controller$_3$ 330 receives heartbeat message 340 at time point $t_1$, and immediately responds with a heartbeat message 341 to Controller$_1$ 310. Heartbeat message 341 is subsequently received by Controller$_1$ 310 at time point $t_2$. Unlike the basic heartbeat protocol, adaptive heartbeat protocol allows for different intervals being configured for different nodes in a cluster. Thus, Controller$_1$ 310 can determine a relative short interval, such as Interval$_1$ 350, for Controller$_3$ 330. After Interval$_1$ 350 lapses and at time point $t_2$, Controller$_1$ 210 transmits the next heartbeat message 342 to Controller$_3$ 330. Similar to the first heartbeat message exchanges, Controller$_3$ 330 receives heartbeat message 342 at time point $t_3$, and immediately responds with a heartbeat message 343 that is received by Controller$_1$ 310 at time point $t_4$.

By contrast, because Link$_1$ 325 is a relatively slow link, Controller$_2$ 320 receives the first heartbeat message 344 at time point $t_5$, which is later than time point $t_1$. Controller$_2$ 320 then responds with a heartbeat message 345, which is received at time point $t_6$ by Controller$_1$ 310. The adaptive heartbeat protocol configures a relatively long interval, such as, Interval$_2$ 355, for Controller$_2$ 320 because Link$_1$ 325 between Controller$_1$ 310 and Controller$_2$ 320 is a relatively slow link. After the interval configured for Controller$_2$ 320 lapses, Controller1 transmits the next heartbeat message 346 to Controller$_2$ 320. Controller$_2$ 320 receives heartbeat message 346 at time point $t_7$. Next, Controller$_2$ 320 responds with a heartbeat message 347, which is received at time point $t_8$ by Controller$_1$ 310.

Therefore, the intervals configured in the adaptive heartbeat protocol can be asymmetric. Specifically, a unique interval value can be configured for each peer node at each heartbeat transmission direction. In the example with three peer nodes in a cluster as illustrated in FIG. 3, there can be up to six different intervals, namely, interval$_1$ for heartbeat messages from Controller$_1$ 310 to Controller$_2$ 320, interval$_2$ for heartbeat messages from Controller$_1$ 310 to Controller$_3$ 330, interval$_3$ for heartbeat messages from Controller$_2$ 320 to Controller$_1$ 310, interval$_4$ for heartbeat messages from Controller$_2$ 320 to Controller$_3$ 330, interval$_5$ for heartbeat messages from Controller$_3$ 330 to Controller$_1$ 310, interval$_6$ for heartbeat messages from Controller$_3$ 330 to Controller$_2$ 320, etc. Note that, the intervals between the same pair of peer nodes in different directions may be different. This is because the transmission time can be affected by both transmission delay at the intermediary nodes and queuing delay at different nodes including both the intermediary nodes as well as the end points (i.e., sending node and receiving node). The queuing delay at different nodes or same node for packets transmitted in different directions may be different. For example, if a large amount of other network traffic going through the same set of intermediary nodes in one particular direction, then it will lead to excessive queuing delays in that particular direction for transmissions between two peer nodes. Transmissions in the reverse direction between the two peer nodes are relatively unaffected.

It can be cumbersome to configure different intervals for each pair of peer nodes in each direction. Hence, embodiments of the present disclosure can use a round trip time (RTT) to estimate the one-way delay between the peer nodes. Specifically, a heartbeat message includes at least a first timestamp from the node that sends the message. When the peer node receives the heartbeat message, the peer node adds a second timestamp. Based on the difference between the first timestamp and the second timestamp, the peer node can estimate the one-way delay between the two nodes upon receiving the heartbeat message. Since the amount of delay can vary, each node performs continuous measurements to determine the average performance.

B. Adaptive Heartbeat Intervals

Figure 4:
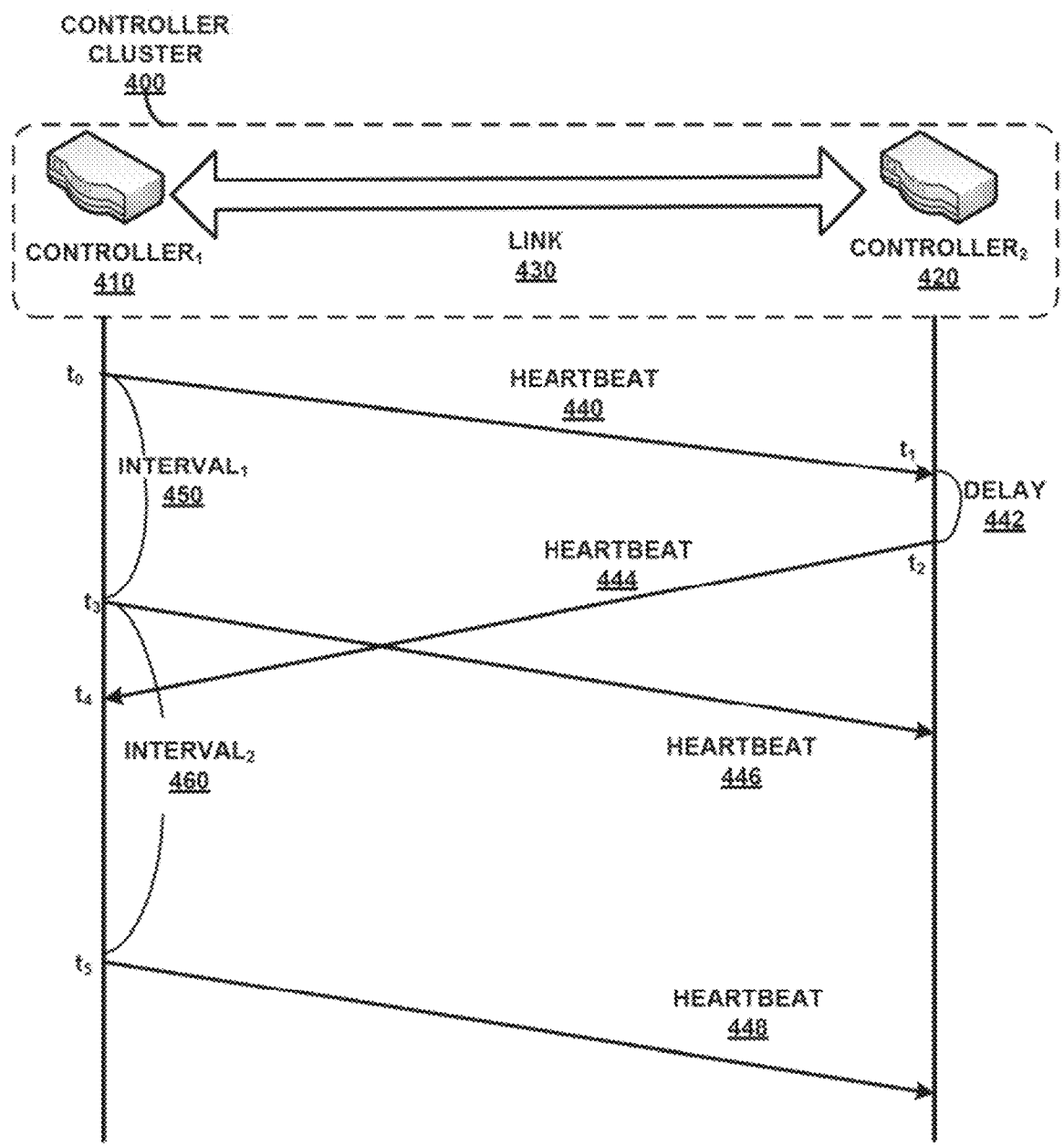
FIG. 4 shows a sequence diagram illustrating exemplary network communication exchanges involved during failure detection of a peer node in a cluster according to embodiments of the present disclosure.

FIG. 4 shows a sequence diagram illustrating exemplary network communication exchanges involved during failure detection of a peer node in a cluster according to embodiments of the present disclosure. FIG. 4 includes at least a Controller$_1$ 410 and a Controller$_2$ 420, both of which belong to Controller Cluster 400. Although only two network controllers are depicted in controller cluster 400, there can be any number of network controller(s) in controller cluster 400. Moreover, the network controllers in controller cluster 400 are interconnected, e.g., via wired links. Specifically, Controller$_1$ 410 and Controller$_2$ 420 are interconnected by Link 430.

The adaptive heartbeat protocol described herein can dynamically adjust the intervals configured for different nodes. For example, assuming that initially, Interval$_1$ 450 is configured for heartbeat messages transmitted from Controller$_1$ 410 to Controller$_2$ 420 based on RTT estimation. At time point $t_0$. Controller$_1$ 410 transmits a heartbeat message 440 to its peer node Controller$_2$ 420 via Link 430.

For illustration purposes only, suppose that Controller$_2$ 420 experiences a delay 442 after receiving heartbeat message 440 before Controller$_2$ 420 can transmit the reply heartbeat message 444 to Controller$_1$ 410 at time point $t_2$. Note that, although delay 442 is depicted as a delay occurring at Controller$_2$ 420, delays in response can also happen due to delays during the transmissions of heartbeat message 440 and/or heartbeat message 444.

After the preconfigured interval, e.g., Interval$_1$ 450, lapses, because Controller$_1$ 410 fails to receive a response message from Controller$_2$ 420, Controller$_1$ 410 transmit a retry heartbeat message, e.g., heartbeat message 446, to Controller$_2$ 420 at time point $t_3$. As a result of delay 442, subsequent to time point t3, Controller$_1$ 410 receives the response message (e.g., heartbeat message 444) to the first heartbeat message (e.g., heartbeat message 440) at time point $t_4$. Based on the difference in time between time point $t_4$ and time point $t_0$, (e.g., a new RTT value), Controller$_1$ 410 can estimate a new heartbeat transmission interval (e.g., Interval$_2$ 460) that is longer than the initial heartbeat transmission interval (e.g., Interval$_1$ 450). The new heartbeat transmission interval may include at least the new RTT value plus a buffer value. After the new heartbeat transmission interval, Interval$_2$ 460, lapses and upon receiving the response heartbeat message within Interval$_2$ 460, Controller$_1$ 410 transmits the next heartbeat message 448 to Controller$_2$ 420 at time point $t_5$.

Therefore, the heartbeat transmission intervals can dynamically adapt to the changing network transmission rates. Specifically, an initial heartbeat transmission interval is determined based at least on a RTT value, and maintained as long as a reply heartbeat message is received from the peer node within the initial heartbeat transmission interval. If, however, a reply heartbeat message is received after the initial heartbeat transmission interval lapses, then the sending node can determine that the peer node is responding slowly, and therefore can slow down the transmission of its heartbeat messages to the peer node by increasing the heartbeat transmission interval value. On the other hand, if a reply heartbeat message is received much sooner than the initial heartbeat transmission interval lapses, then the sending node can determine that the peer node is responding quickly, and therefore can transmit the heartbeat messages more frequently by decreasing the heartbeat transmission interval value.

C. Aggressive Interval Adjustment in Response to Misses

Figure 5:
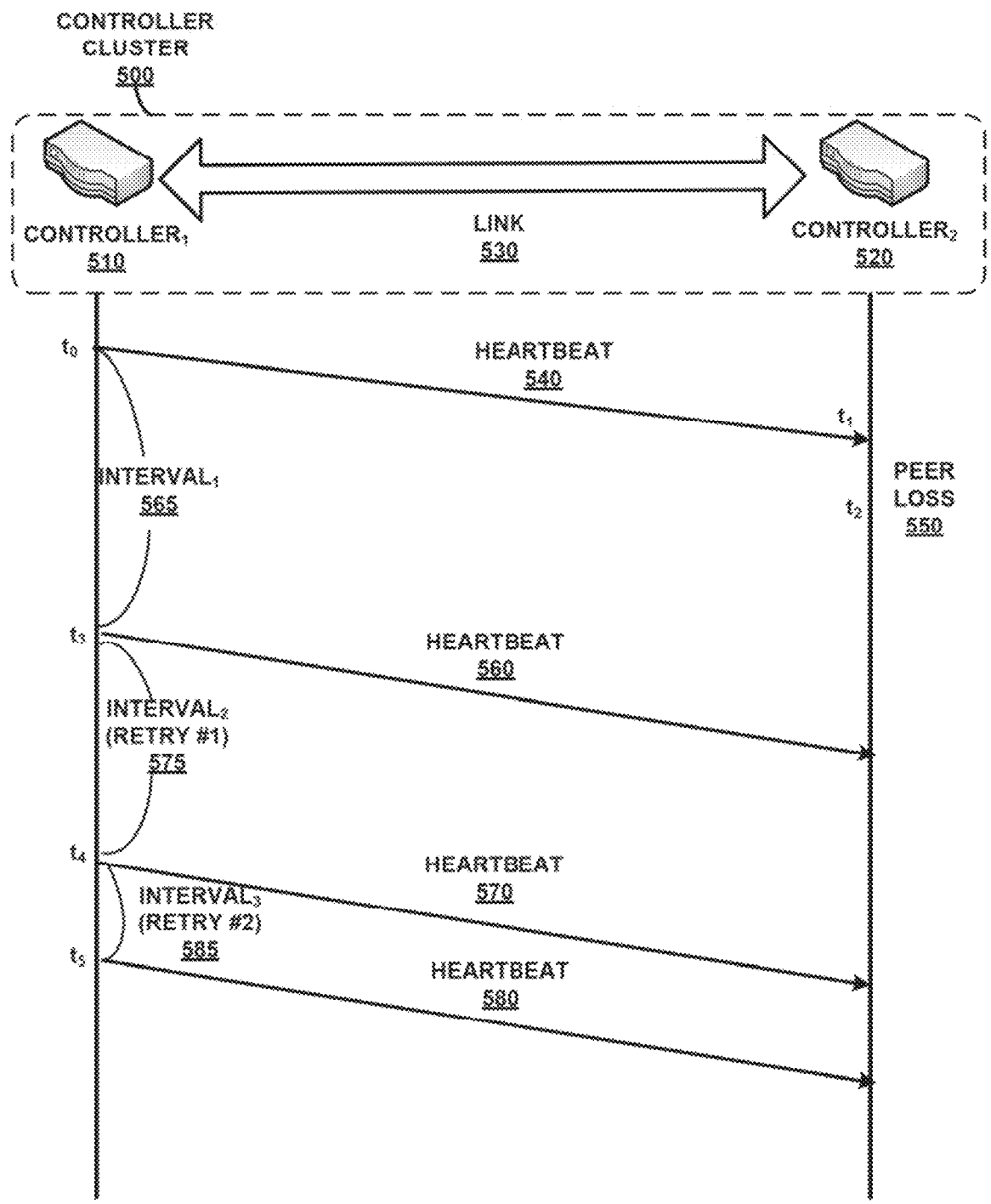
FIG. 5 shows a sequence diagram illustrating exemplary network communication exchanges involved during failure detection of a peer node in a cluster according to embodiments of the present disclosure.

FIG. 5 shows a sequence diagram illustrating exemplary network communication exchanges involved during failure detection of a peer node in a cluster according to embodiments of the present disclosure. FIG. 5 includes at least a Controller$_1$ 510 and a Controller$_2$ 520, both of which belong to Controller Cluster 500. Although only two network controllers are depicted in controller cluster 500, there can be any number of network controller(s) in controller cluster 500. Moreover, the network controllers in controller cluster 500 are interconnected, e.g., via wired links. Specifically, Controller$_1$ 510 and Controller$_2$ 520 are interconnected by Link 530.

The adaptive heartbeat protocol described herein will aggressively adjust the intervals configured for a peer node in response to a missed reply. For example, assuming that initially, Interval$_1$ 565 is configured for heartbeat messages transmitted from Controller$_1$ 510 to Controller$_2$ 520 based on RTT estimation. At time point $t_0$, Controller$_1$ 510 transmits a heartbeat message 540 to its peer node Controller$_2$ 520 via Link 530.

For illustration purposes only, suppose that Controller$_2$ 520 is lost from the network at time point $t_2$. As a result, Controller$_2$ 520 will not be responding to any heartbeat message transmitted from Controller$_1$ 510 to Controller$_2$ 520. Because Controller1 510 fails to receive a reply message from Controller2 520, at time point t3 after the first interval, e.g., Interval$_1$ 565 lapses, Controller$_1$ 510 will retransmit the heartbeat message (e.g., heartbeat message 560) to Controller$_2$ 520. After a preconfigured first retry interval, e.g., Interval$_2$ 575, lapses, if Controller$_1$ 510 fails to receive a reply message from Controller$_2$ 520, Controller$_1$ 510 will retransmit, at time point $t_4$, the heartbeat message (e.g., heartbeat message 570) for a second time to Controller$_2$ 520. Thereafter, after a preconfigured second retry interval, e.g., Interval$_3$ 585, lapses, Controller$_1$ 510 will retransmit, at time point $t_5$, the heartbeat message (e.g., heartbeat message 580) for a third time to Controller$_2$ 520. Moreover, assuming that Controller$_1$ 510 is configured to send up to three retry heartbeat messages. Thus, after Controller$_1$ 510 fails to receive any reply message from Controller$_2$ 520 after the third and final heartbeat message (e.g., heartbeat message 580) is sent, Controller$_1$ 510 will declare Controller$_2$ 520 as a lost peer node.

It is important to note that conventional peer communications typically slow down the packet transmission in the event of a packet loss, because the system often presumes that the packet loss may be caused by network congestion and thus will not transmit any additional network packets to overload the congested network. Here, however, Interval$_3$ 585 is configured to be shorter than Interval$_2$ 575, which is configured to be shorter than Interval$_1$ 565. In other words, Controller$_1$ 510 will aggressively transmit heartbeat messages to its peer node upon detecting a packet loss in order to determine whether the peer node is indeed a lost node in the network or an active node experiencing temporary network congestions. The aggressive shortening of retransmission intervals for heartbeat messages upon detecting a packet loss allows for a quicker confirmation of a peer node failure.

Process for Dynamic and Adaptive Failure Detection of Node in Cluster

Figure 6:
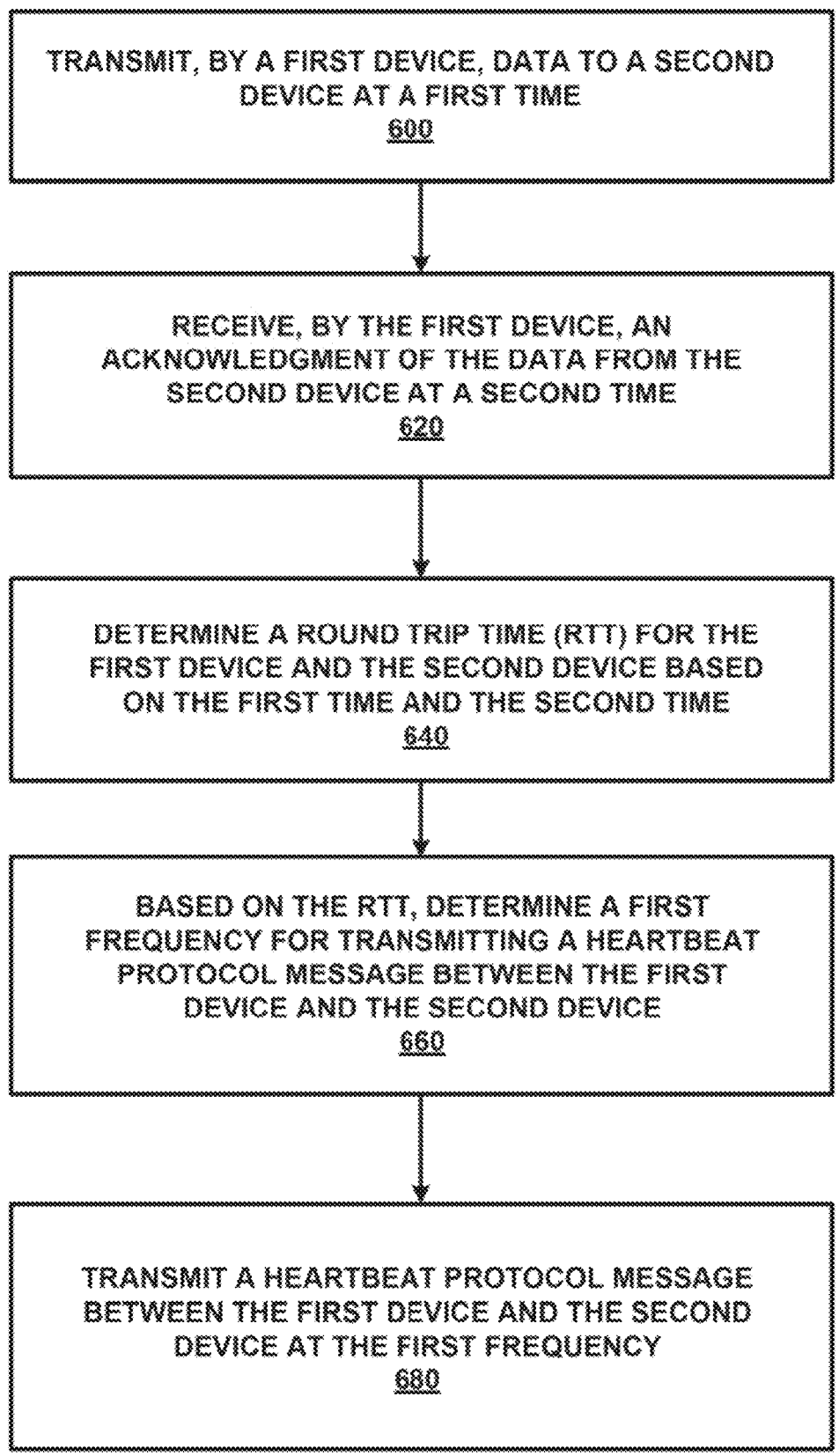
FIG. 6 shows a flowchart illustrating an exemplary process for dynamic and adaptive failure detection of node in a cluster according to embodiments of the present disclosure.

FIG. 6 shows a flowchart illustrating an exemplary process for dynamic and adaptive failure detection of node in a cluster according to embodiments of the present disclosure. During operations, a first network device transmits data to a second device at a first time (operation 600). The first network device then receives an acknowledgment of the data from the second device at a second time (operation 620). Next, the first network device determines a Round Trip Time (RTT) for transmissions between the first device and the second device based on the first time and the second time (operation 640). Based on the RTT, the first network device determines a first frequency for transmitting a heartbeat protocol message between the first device and the second device (operation 660). Then, the first network device transmits a heartbeat protocol message between the first device and the second device at the first frequency (operation 680).

In some embodiments, the first network device further re-measures the RTT for the first device and the second device based on current network conditions. Moreover, the first network device can dynamically update the first frequency for transmitting the heartbeat protocol message between the first device and the second device. Specifically, in some embodiments, the first network device may increase the first frequency of transmitting the heartbeat protocol message in response to determining a reduction in the RTT. In some embodiments, the first network device may decrease the first frequency of transmitting the heartbeat protocol message in response to determining an increase in the RTT.

In some embodiments, the first network device transmits the heartbeat protocol message to the second device at the first frequency. In some embodiments, the second device transmits the heartbeat protocol message to the first network device at a second frequency that is different than the first frequency (e.g., at a different frequency at which the first network device transmits heartbeat protocol message to the second device). In some embodiments, the second device transmits the heartbeat protocol message to the first network device at the first frequency (e.g., at the same frequency at which the first network device transmits heartbeat protocol message to the second device).

In some embodiments, the first frequency can be larger than the RTT, for example, by adding a buffer amount of time to the RTT.

In some embodiments, subsequent to transmitting the heartbeat protocol message between the first device and the second device at the first frequency, the first network device determines that no response is received in response to a particular heartbeat protocol message, and retries transmission of the particular heartbeat protocol message in a first retry message. Note that, a time period between transmitting the particular heartbeat protocol message and the first retry message is based on the RTT.

In some embodiments, subsequent to retrying transmission of the particular heartbeat protocol message via the first retry message, the first network device further determines that no response is received in response to the first retry message. and retries transmission of the particular heartbeat protocol message via a second retry message. Note that, (a) a first time difference between transmission of the particular heartbeat protocol message and the first retry message is greater than (b) a second time difference between transmission of the first retry message and the second retry message. Furthermore, in some embodiments, (a) the first frequency for transmitting the heartbeat protocol message between the first device and the second device is different than (b) a second frequency for transmitting the heartbeat protocol message between the first device and a third device.

System for Dynamic and Adaptive Failure Detection of Node in Cluster

Figure 7:
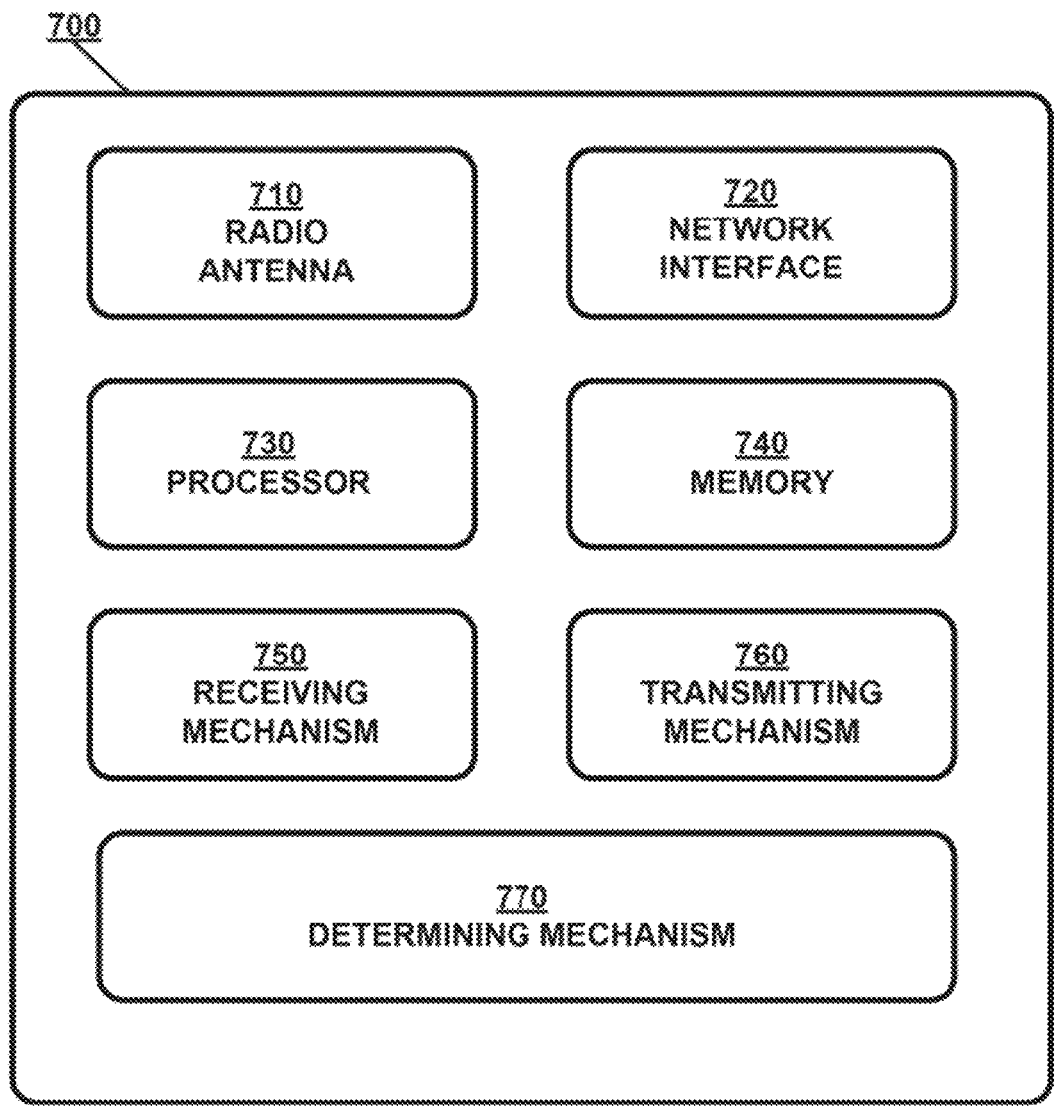
FIG. 7 is a block diagram illustrating an exemplary system for dynamic and adaptive failure detection of node in a cluster according to embodiments of the present disclosure.

FIG. 7 is a block diagram illustrating an exemplary system for dynamic and adaptive failure detection of node in a cluster according to embodiments of the present disclosure. Network device 700 includes at least one or more radio antennas 710 capable of either transmitting or receiving radio signals or both, a network interface 720 capable of communicating to a wired or wireless network, a processor 730 capable of processing computing instructions, and a memory 740 capable of storing instructions and data. Moreover, network device 700 further includes a receiving mechanism 750, a transmitting mechanism 760, and a determining mechanism 770, all of which are in communication with processor 730 and/or memory 740 in network device 700. Network device 700 may be used as a client system, or a server system, or may serve both as a client and a server in a distributed or a cloud computing environment.

Radio antenna 710 may be any combination of known or conventional electrical components for receipt of signaling, including but not limited to, transistors, capacitors, resistors, multiplexers, wiring, registers, diodes or any other electrical components known or later become known.

Network interface 720 can be any communication interface, which includes but is not limited to, a modem, token ring interface, Ethernet interface, wireless IEEE 802.11 interface, cellular wireless interface, satellite transmission interface, or any other interface for coupling network devices.

Processor 730 can include one or more microprocessors and/or network processors. Memory 740 can include storage components, such as, Dynamic Random Access Memory (DRAM), Static Random Access Memory (SRAM), etc.

Receiving mechanism 750 generally receives one or more network messages via network interface 720 or radio antenna 710 from a wireless client. The received network messages may include, but are not limited to, requests and/or responses, beacon frames, management frames, control path frames, and so on. Specifically, receiving mechanism 750 can receive an acknowledgment of the data from another network device at a particular time.

Transmitting mechanism 760 generally transmits messages, which include, but are not limited to, requests and/or responses, beacon frames, management frames, control path frames, and so on. Specifically, transmitting mechanism 760 can transmitting data to a second device at a first time. Moreover, transmitting mechanism 760 can transmit a heartbeat protocol message between the first device and the second device at the first frequency. In some embodiments, transmitting mechanism 760 dynamically updates the first frequency for transmitting the heartbeat protocol message between the first device and the second device.

Specifically, transmitting mechanism 760 can increase the first frequency of transmitting the heartbeat protocol message in response to determining mechanism 770 determining a reduction in the RTT. On the other hand, transmitting mechanism 760 decreases the first frequency of transmitting the heartbeat protocol message in response to determining mechanism 770 determining an increase in the RTT.

In some embodiments, a first device transmitting the heartbeat protocol message to a second device at the first frequency. The second device transmits the heartbeat protocol message to the first device at a second frequency different than the first frequency. In some embodiments, the second device transmits the heartbeat protocol message to the first device at the first frequency. In some embodiments, the first frequency is larger than the RTT.

Moreover, in some embodiments, transmitting mechanism 760 retries transmission of the particular heartbeat protocol message in a first retry message. Specifically, a time period between transmitting the particular heartbeat protocol message and the first retry message is based on the RTT.

Furthermore, in some embodiments, transmitting mechanism 760 retries transmission of the particular heartbeat protocol message via a second retry message. Here, (a) a first time difference between transmission of the particular heartbeat protocol message and the first retry message is greater than (b) a second time difference between transmission of the first retry message and the second retry message. In some embodiments, (a) the first frequency for transmitting the heartbeat protocol message between the first device and the second device is different than (b) a second frequency for transmitting the heartbeat protocol message between the first device and a third device.

Determining mechanism 770 generally intercepts a network message, applies firewall policies, and forwards a portion of data to the recipient of the message. Specifically, determining mechanism 770 can determine a Round Trip Time (RTT) for the first device and the second device based on the first time and the second time. Based on the RTT, determining mechanism 770 determines a first frequency for transmitting a heartbeat protocol message between the first device and the second device. Furthermore, determining mechanism periodically re-measures the RTT for the first device and the second device based on current network conditions.

In some embodiments, subsequent to transmitting mechanism 760 transmitting the heartbeat protocol message between the first device and the second device at the first frequency, determining mechanism 770 determines that no response is received in response to a particular heartbeat protocol message.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A method comprising:
transmitting, by a first network device, data to a second network device over a communication link at a first time;
receiving, by the first network device, an acknowledgment of receipt of the data over the communication link from the second network device at a second time;
determining, by the first network device, a communication Round Trip Time (RTT) between the first network device and the second network device based on the first time and the second time;
determining a first frequency that is larger than the RTT;
transmitting a heartbeat protocol message between the first network device and the second network device at the first frequency;
re-determining the RTT based on current network conditions; and
dynamically updating the first frequency for transmitting the heartbeat protocol message by increasing the first frequency of transmitting the heartbeat protocol message in response to determining a reduction in the RTT or by decreasing the first frequency of transmitting the heartbeat protocol message in response to determining an increase in the RTT, wherein the heartbeat messages represent an active status of the first network device and the acknowledgment represents an active status of the second network device.

2. The method of claim 1, wherein transmitting the heartbeat protocol message between the first network device and the second network device at the first frequency comprises the first network device transmitting the heartbeat protocol message to the second network device at the first frequency.

3. The method of claim 2, wherein the operations further comprise the second network device transmitting the heartbeat protocol message to the first network device at a second frequency different than the first frequency.

4. The method of claim 1, wherein transmitting the heartbeat protocol message between the first network device and the second network device at the first frequency comprises the second network device transmitting the heartbeat protocol message to the first network device at the first frequency.

5. The method of claim 1, further comprising:
subsequent to transmitting the heartbeat protocol message between the first network device and the second network device at the first frequency,
determining that no response is received in response to a particular heartbeat protocol message; and
retrying transmission of the particular heartbeat protocol message in a first retry message, wherein a time period between transmitting the particular heartbeat protocol message and the first retry message is based on the RTT.

6. The method of claim 1, further comprising:
subsequent to transmitting the heartbeat protocol message between the first network device and the second device at the first frequency,
determining that no response is received in response to a particular heartbeat protocol message;
retrying transmission of the particular heartbeat protocol message via a first retry message;
determining that no response is received in response to the first retry message;
retrying transmission of the particular heartbeat protocol message via a second retry message, wherein (a) a first time difference between transmission of the particular heartbeat protocol message and the first retry message is greater than (b) a second time difference between transmission of the first retry message and the second retry message.

7. The method of claim 1, wherein (a) the first frequency for transmitting the heartbeat protocol message between the first network device and the second network device is different than (b) a second frequency for transmitting the heartbeat protocol message between the first network device and a third network device.

8. A network device comprising:
a memory;
a processor coupled to the memory, wherein the processor executes a plurality of instructions stored in the memory to:
transmit data to another network device at a first time;
receive an acknowledgment of receipt of the data from the another network device at a second time;
determine a Round Trip Time (RTT) based on the first time and the second time, the Round Trip Time representing a time period from the data transmission to receipt acknowledgment;
determine a first frequency that is larger than the RTT;
transmit a heartbeat protocol message to the another network device at the first frequency;
re-determine the RTT based on current network conditions; and
update the first frequency for transmitting the heartbeat protocol message by increasing the first frequency of transmitting the heartbeat protocol message in response to determining a reduction in the RTT or by decreasing the first frequency of transmitting the heartbeat protocol message in response to determining an increase in the RTT, wherein the heartbeat messages represent an active status of the network device and the acknowledgment represents an active status of the another network device.

9. The network device of claim 8, wherein the processor further executes the plurality of instructions stored in the memory to:
transmit the heartbeat protocol message to the another network device at the first frequency.

10. The network device of claim 9, wherein the another network device transmits the heartbeat protocol message to the network device at a second frequency different than the first frequency.

11. The network device of claim 8, wherein the another network device transmits the heartbeat protocol message to the network device at the first frequency.

12. The network device of claim 8, wherein subsequent to transmitting the heartbeat protocol message between the network device and the another network device at the first frequency, the processor further executes the plurality of instructions stored in the memory to:
- determine that no response is received in response to a particular heartbeat protocol message;
- retry transmission of the particular heartbeat protocol message in a first retry message, wherein a time period between transmitting the particular heartbeat protocol message and the first retry message is based on the RTT;
- determine that no response is received in response to a particular heartbeat protocol message;
- retry transmission of the particular heartbeat protocol message via a first retry message;
- determine that no response is received in response to the first retry message; and
- retry transmission of the particular heartbeat protocol message via a second retry message, wherein (a) a first time difference between transmission of the particular heartbeat protocol message and the first retry message is greater than (b) a second time difference between transmission of the first retry message and the second retry message.

13. The network device of claim 8, wherein (a) the first frequency for transmitting the heartbeat protocol message between the network device and the another network device is different than (b) a second frequency for transmitting the heartbeat protocol message between the network device and a further network device.

14. A network comprising:
- a cluster having a plurality of network devices;
- a plurality of client devices; and
- a plurality of access points controlled by the network devices and connecting the network devices to the client devices, wherein a first one of the plurality of network devices:
  - transmits data to a second one of the plurality of network devices at a first time;
  - receives an acknowledgment of receipt of the data from the second network device at a second time;
  - determines a communication Round Trip Time (RTT) between the first network device and the second network device based on the first time and the second time;
  - determines a first frequency that is larger than the RTT;
  - transmits a heartbeat protocol message to the second network device at the first frequency;
  - re-determines the RTT based on current network conditions; and
  - dynamically updates the first frequency for transmitting the heartbeat protocol message by increasing the first frequency of transmitting the heartbeat protocol message in response to determining a reduction in the RTT or by decreasing the first frequency of transmitting the heartbeat protocol message in response to determining an increase in the RTT, wherein the heartbeat messages represent an active status of the first network device and the acknowledgment represents an active status of the second network device.

* * * * *